United States Patent Office 2,781,479
Patented Feb. 12, 1957

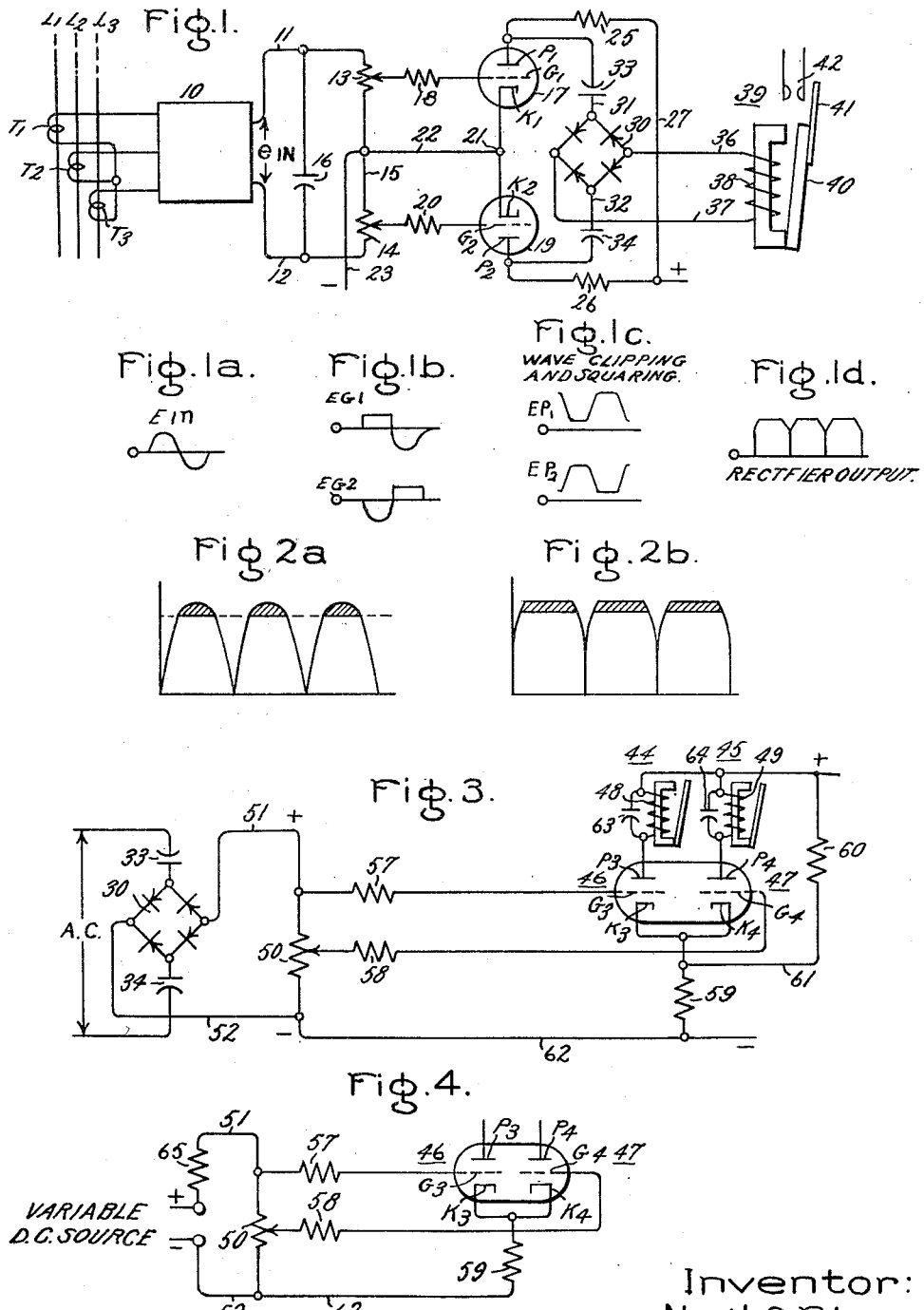

2,781,479

HIGH SPEED PICK UP ENERGIZATION CONTROL SYSTEM FOR RELAYS

Neil O. Rice, Secane, Pa., assignor to General Electric Company, a corporation of New York Application August 21, 1952, Serial No. 305,624

9 Claims. (Cl. 317—149)

The invention relates to energization systems for relays or the like, particularly rectified alternating current pick up energization control systems for electromagnetically operated relays or similar electroresponsive elements having characteristics such that the speed of response is dependent upon the continuity of energization at a predetermined value.

One object is to provide electronic means for clipping and thereby squaring the alternating current waves prior to rectification so as to enable a high speed discriminating response to be obtained in alternating current power system fault responsive devices or other similar apparatus involving electroresponsive elements of the above character.

Another object is to provide an improved electronic energization control system for obtaining high speed response of a pair of relay or electroresponsive elements in a predetermined timed sequence when a controlling alternating current signal exceeds a predetermined magnitude or control value.

A specific object is to provide an improved electronic alternating current clipping or square wave forming amplifier and capacitor coupled voltage doubling full wave rectifier combination suitable for control by a variable alternating current signal to effect a substantially uniform unidirectional energization of a relay or electroresponsive element having inductance so as to produce high speed response thereof when the alternating current control signal reaches or exceeds a predetermined value.

Such improved combination is particularly adapted for incorporation in high speed fault responsive protective phase comparison relay apparatus for alternating current power transmission systems of the type disclosed in the Fitzgerald Patent 1,797,976 or in other alternating current signal relaying apparatus where the speed of response of an electromagnetic relay or other electroresponsive element can be increased by clipping or square wave forming prior to rectification of the signal.

Usually when an amplified and rectified alternating current is utilized for the unidirectional energization of an electromagnetic relay having an armature or plunger for operating circuit controlling switches, sluggish and noisy chattering or indecisive operation of the relay armature or plunger inevitably will result when the magnitude of the alternating current is at or only slightly exceeds the effective value required to pick up the relay armature. This is due to the fact that the peaks of the alternating current waves are effective intermittently for supplying or controlling the critical amount of energy required to pick up the relay armature at the effective value of the alternating current. But when a continuous unidirectional current of the same value is applied, the relay armature will have a high speed positive pick up and the relay chattering and indecisive action are precluded.

In accordance with the present invention, suitable alternating current grid controlled electronic clipping and square wave forming amplifying means are capacitor coupled with a full wave rectifier and calibrated to provide a square wave rectification that will produce substantially a continuous or uniform unidirectional energization of the relay when the alternating current is at or just exceeds the desired effective magnitude or control value at which the relay is to pick up. In this way, the amplitude of the square wave forms that are rectified and supplied for unidirectional energization of the relay can always be limited substantially to the most effective pick up value even though the alternating current increases to a much higher value. Thus such production of a substantially continuous or uniform output square wave form that simulates pure direct current will always result in a very fast and positive pick up action of the relay armature at as well as just above the desired alternating current control value.

It is important to note that this same result can never be obtained by simply increased amplification of the alternating current supplied to the rectifier as this would result in merely lowering the effective pick up or control value of the alternating current. Thus in such a case, the relay armature would simply pick up at the lower effective value of the alternating current but continue to do so slowly, noisily and indecisively. However, by applying the improved limiting principles of the present invention in suitably amplifying the alternating current while at the same time clipping or squaring each half wave of the amplified current that is supplied to the rectifier, a substantially continuous square wave can be formed which at or above the desired pick up or control value of the alternating current will approximate a direct current attraction of the relay armature and thereby provide high speed positive pick up thereof whenever the alternating current signal reaches or exceeds the desired control value.

A further object of the invention is to provide an improved electronic sequencing and coordinate timing control for insuring that a fixed minimum time interval is interposed in the sequential response of a pair of relay or electroresponsive elements when an energizing signal exceeds a predetermined value.

In accordance with the invention such sequential time coordination of the relay response is obtained by providing each relay or electroresponsive element with a separate grid controlled electron discharge device for amplifying the energy supplied to the relay to effect response thereof. The controlling direct current signal voltage is proportioned by means of a voltage divider provided with separate resistance connections with the grids of the electron discharge devices proportioned so that the grid of the first device always receives a greater proportion of the signal voltage than the grid of the second device. The resistance ratio proportioning is such that when the grid of the first electron discharge device receives a sufficient signal to render the device conductive to effect response of the corresponding relay element, the discharge device will then become saturated and conduct grid current, thereby limiting the input signal to a predetermined value. The voltage divider then automatically supplies the predetermined lesser portion of the limited input signal to the grid of the second electron discharge device to render this device conductive to effect response of the corresponding or second relay element. In this way the first relay element will always respond a definite time interval before the instant that the second relay element responds.

The features of the invention which are believed to be novel are set forth with particularity in the appended claims. The invention itself, however, both as to its organization and method of operation, together with further objects and advantages thereof, may best be understood by reference to the following description taken in connection with the accompanying drawings.

Fig. 1 of the drawing is a circuit diagram of a relay energization system embodying the electronic wave-modifying improvements of the present invention. Figs. 1a–b–c–d show the typical wave forms produced at various stages in the energization system of Fig. 1. Fig. 2a shows an ordinary rectified alternating current energization wave form while Fig. 2b shows the improved rectified square wave form of energization provided by the present invention. Fig. 3 is a modification of Fig. 1 showing an improved electronic sequencing and coordinate timing control for energizing a pair of relay elements sequentially with a predetermined time interval interposed therebetween. Fig. 4 is a further modification showing a variable direct current source provided with a voltage limiting resistor for effecting the sequential timed pick up energization of the two relays instead of the rectified alternating current energization shown in Fig. 3.

In the energization system shown in Fig. 1, a control signal is produced upon a predetermined fault on the alternating current transmission lines L1, L2, L3 by means of the three current transformers T1, T2, T3 that are interconnected with a suitable negative phase sequence network 10 so as to supply an alternating current output voltage indicated as $E_m$, in Fig. 1a. Such alternating current signal voltage is impressed through conductors 11 and 12 upon the voltage dividing resistors 13 and 14 which are interconnected by conductor 15. A capacitor 16 is interconnected between the conductors 11 and 12 so as not only to be subjected to the alternating current signal voltage but also to accumulate additional grid biasing charges of opposite polarity under the operating conditions more fully described hereinafter.

The clipping and squaring wave forming of the alternating current signal is accomplished by means of a pair of electron discharge devices 17 and 19 that are shown as of the conventional triode type having separate envelopes although they may be enclosed in a single envelope if desired. These devices are connected in push-pull relationship and grid leak bias is accomplished by running each device with no cathode bias. The cathodes $K_1$ and $K_2$ may be heated in any suitable manner. The control electrodes $G_1$ and $G_2$ are connected to be energized so as to produce the clipping of each half-wave of the alternating current control signal. For this purpose, the grid $G_1$ of the electron discharge device 17 is connected through a dropping resistor 18 having a variable connection to the voltage dividing resistor 13 and the grid $G_2$ of electron discharge device 19 likewise is connected through a dropping resistor 20 having a similarly adjustable connection to resistor 14. With such connections, each signal half wave will appear positive with respect to one of the electron devices 17 and 19 and negative with respect to the other so that these devices can be controlled to produce clipped half waves of alternating current of the same frequency as the control signal. The clipping action is accomplished in each electron discharge device on the negative half-cycles by the control electrodes being driven below the current cut-off potential and on the positive half-cycles by grid saturation, i. e., the grid current produces a potential drop in the grid resistor whereby the positive grid potential is limited and the anode current is limited. The opposite grid leak biases thus developed by the resistors 18 and 20 during opposite half cycles will be stored on the condenser 16 and each bias is large enough to become effective between half cycles to cause the grid to be driven below the cut-off point of the device, thereby clipping the positive portion of the output wave form as seen at the plates. The negative portion of the output wave form on the plates is clipped by grid limiting.

Fig. 1b illustrates the clipped wave forms EG1 and EG2 that are developed on the grids or control electrodes G1 and G2 of the respective electron discharge devices 17 and 19. Similarly, Fig. 1c illustrates the clipped output wave potentials produced on the plates P1 and P2 which are applied to suitable loading resistors 25 and 26 connected respectively with the plates P1 and P2 to a suitable voltage source indicated as $+$ and $-$. The cathodes $K_1$ and $K_2$ of the electron discharge devices 17 and 19 are interconnected by the conductor 21 and the grid cathode circuit is extended by conductor 22 to the mid-point between the signal voltage dividing resistors 13 and 14 which is connected with the negative terminal of the plate voltage source.

In accordance with the present invention, the clipped or squared wave output of the electron discharge devices 17 and 19 are supplied to a full-wave rectifier 30 having the input terminals 31 and 32 thereof provided with the isolating and voltage doubling capacitors 33 and 34. The output terminals of the full-wave rectifier 30 are connected by the conductors 36 and 37 to energize the operating winding 38 of an electromagnetic relay or like electroresponsive device 39 which is to pick up or respond when the alternating current reaches or exceeds a predetermined effective magnitude or control value. During one half cycle of the alternating current control signal, electron discharge device 17 is rendered conductive to produce current flow in the circuit extending from the negative terminal 23 through 22, 21, 17, 33, 36, 38, 37, 32, 34, and 26 to the positive terminal. During the succeeding half cycle, electron discharge device 19 is rendered conductive to produce current flow in the circuit extending from the negative terminal 23 through 22, 21, 19, 34, 36, 38, 37, 31, 33, and 25 to the positive terminal. As a result the capacitors 33 and 34 will become positively charged during successive half cycles so as to produce a voltage doubling action.

The relay or electroresponsive device 39 is shown as of the conventional type having an armature 40 provided with an operating member 41 for operating suitable switches 42. Such an electroresponsive device inherently has inductance and when energized with an ordinary rectified alternating current such as indicated in Fig. 2a, will at the effective pick up value of the alternating current respond noisily and indecisively due to the fact that the peaks of the rectified waves are effective for supplying the critical part of the energy required to pick up the relay or electroresponsive device as indicated by the sectioned portions of the waves shown in Fig. 2a. However, when the relay or electroresponsive device 39 is energized by means of the improved energization modifying system shown in Fig. 1 wherein each half-wave of the alternating current output of the push-pull connected electron devices 17 and 19 is clipped and squared thereby prior to rectification, then the energization at the pick-up of value for the relay or electroresponsive device will correspond substantially to a direct current as indicated in Fig. 2b and the substantially uniform squared part of the waves will be effective for producing a high speed and positive pick-up of the relay at the effective value of the alternating current control signal.

The capacitors 33 and 34 serve to isolate the full-wave rectifier 30 from the plate voltage source. These capacitors 33 and 34 also serve to double the voltage output of the electron discharge devices 17 and 19. This is due to the fact that capacitors 33 and 34 are oppositely charged by each of the electron discharge devices 17 and 18. Thus, the voltage accumulated on the capacitors serves to double the voltage produced by each electron discharge device during the alternate half-cycles of the alternating current control signal. In this way, the final output voltage provided by the rectifier 30 is amplified and will substantially produce a pure direct current and thereby effect a high speed positive response of the relay or electroresponsive device 39 when the alternating current signal reaches the predetermined effective control value. This is also true in case the alternating current signal substantially exceeds the desired pick-up control value. Thus, comparative tests have shown that at 1½ times the pick-up or control value of the alternating current, a conventional electromagnetic relay will pick up in 8 milliseconds as compared to 48 milliseconds required when the relay is energized with the conventional unclipped rectified alternating current. Such a marked increase in the speed of response of a relay is particularly advantageous in fault-responsive apparatus for effecting the closure of circuit breaker trip circuits whenever a predetermined effective value of fault current is reached on the alternating current power transmission line. This is particularly true in the phase comparison type of fault-responsive relays wherein the operation of the tripping control is inherently limited to alternate half-cycles.

The modification shown in Fig. 3 provides for sequencing and coordinate timing control of the pick-up of a pair of relays or other like electroresponsive devices 44 and 45 when a rectified alternating current or other direct current control signal such as indicated in Fig. 4 exceeds a predetermined value. In the modification of Fig. 3, the full-wave rectifier 30 may be supplied with clipped and amplified alternating current signal through the isolating capacitors 33 and 34 in the same manner as previously described in connection with Fig. 1. The full-wave rectifier output voltage or other direct current variable signal as indicated in Fig. 4 is supplied to a suitable voltage divider resistor 50 through conductors 51 and 52. The pair of electromagnetic relays 44 and 45 which must have a fixed sequence and interval of operation each have separate grid controlled electron discharge devices 46 and 47 for energizing the respective operating windings 48 and 49 thereof. The control grids G3, G4, the plates P3, P4, and the cathodes K3, K4 of these devices may be enclosed in separate envelopes or preferably in a single envelope as shown in Fig. 3.

In accordance with the present invention, the grid G3 of the electron discharge device for energizing the first relay 44 is connected through the dropping resistor 57 to the conductor 51 and the grid G4 of the electron discharge device energizing the second relay 45 is connected through the dropping resistor 58 and an adjustable tap on the resistor 50. The electron discharge devices 46 and 47 are normally biased below cut-off by means of the resistors 59 and 60 which are connected across the plate voltage source indicated as + and — with the intermediate conductor 61 therebetween connected to the cathodes K3 and K4 of each device. The negative terminal also is connected by conductor 62 to the resistor 50. In this way the grids G3 and G4 are normally maintained negative with respect to the cathodes K3 and K4 and thus render the electron discharge devices non-conductive. The smoothing capacitors 63 and 64 may be connected across the relay windings 48 and 49 respectively, if desired.

The operation is as follows. In the event of a fault on the protected lines L1, L2, L3 shown in Fig. 1, an alternating current voltage is built up across the full-wave rectifier 30 and applied to the loading resistor 50. The ratio of the resistors 57 and 58 is such with respect to the resistor 50 that the grid G3 controlling the electron discharge device 46 for energizing relay 44 as it goes positive with respect to cathode K3 will limit the voltage the full-wave rectifier 30 can develop by producing saturation of the electron discharge devices 17 and 19 feeding the rectifier. This is due to the fact that the grid G3 and cathode K3 act as a diode since when the grid goes positive with respect to the cathode it draws current and the grid-to-cathode dynamic resistance decreases. This causes a voltage drop through the inherent resistance of the rectifier and also resistor 57 and keeps the grid G4 always a fixed minimum less positive than the grid G3 as determined by the potentiometer 50. Consequently, when the rectifier voltage output rises above the effective value necessary to drive the control grid G3 positive so as to cause the operating winding 48 of the relay 44 to be energized and pick up the relay, then the proportioning of the resistors 50, 57, 58 keeps the grid G4 always a fixed minimum less positive than the grid G3. Thus, the grid G3 going positive will hold the voltage which can be applied to the grid G4 at a constant maximum value in respect to the grid G3. The maximum rectifier output voltage is always limited by plate saturation of the electron discharge devices feeding the rectifier. Thus, the improved regulating circuit shown can, by suitable proportioning of resistance values of 50, 57 and 58, maintain a desired or fixed minimum time interval between the pick-up of relay 44 and relay 45 since their pick-up times depend on their respective control voltages. Hence, the end result is to maintain a desired or fixed minimum time interval between the pick-up of relay 44 and relay 45 no matter what magnitude of fault on the protected line, provided the fault is large enough to effect the pick-up operation of both relays.

Fig. 4 involves a further modification wherein a variable direct current source, rather than a rectified alternating current is utilized for controlling the sequential timed pick-up energization of the relays 44 and 45. The only change required from the circuit arrangement shown in Fig. 3 is the provision of the resistor 65 which serves the same purpose as the internal resistance of the rectifier and its circuits in limiting the voltage when the grid G3 of the electron discharge device 46 is driven positive so as to thereby draw current through resistors 65 and 57 that are proportioned to limit the voltage that is applied through resistors 50 and 58 to the control grid G4 of the electron discharge device 47. In this way, the pick up of relay 44 always occurs a fixed time interval prior to the pick up of relay 45, when the variable direct current voltage source increases to a value sufficient to effect pick up operation of both relays.

What I claim as new and desire to secure by Letters Patent of the United States is:

1. In combination, an electroresponsive device having a variable speed of response dependent upon the energization thereof, means for energizing the device including an alternating current full wave rectifier having output connections for supplying unidirectional energizing current to the device, and alternating current input connections for the rectifier including electron discharge means for supplying clipped half waves of the alternating current to the rectifier to increase the speed of response of the device.

2. In combination, an electroresponsive device having a variable speed of response dependent upon the energization thereof, means for energizing the device including an alternating current full wave rectifier having output connections for supplying unidirectional energizing current to the device and alternating current input connections each input connection including a voltage doubling capacitor, and electron discharge means for supplying clipped half waves of the alternating current supplied to the rectifier voltage doubling capacitors to increase the speed of response of the device.

3. In combination, an alternating current full wave rectifier, input connections for the rectifier including electron discharge means for supplying clipped half waves of alternating current to the rectifier to limit the rectifier output voltage, and output connections for the rectifier including an electromagnetic relay responsive to the limited rectifier output voltage.

4. In combination, an electromagnetic relay, means including an alternating current full wave rectifier having unidirectional output connections for energizing the relay, and alternating current input connections for the rectifier including electron discharge means for supplying clipped and thereby squared half waves of the alternating current to the rectifier to effect high speed response of the relay when the alternating current reaches a predetermined value.

5. In combination, an electroresponsive device having inductance, means including an alternating current full wave rectifier having output connections for energizing the device, and alternating current input connections for the rectifier including electron discharge wave clipping means provided with control means for supplying squared half waves of alternating current to the rectifier to increase the speed of response of the device.

6. In combination, an electromagnet having an armature operated thereby, means for energizing the electromagnet including an alternating current full wave rectifier having output connections for supplying unidirectional energizing current to the electromagnet, and alternating current input connections for the rectifier including grid controlled electron discharge means for supplying clipped and thereby squared half waves of the alternating current supplied to the rectifier to increase the speed of operation of the armature.

7. In combination, an electroresponsive device having a variable speed of response dependent upon the continuity of energization thereof, means for energizing the device including an alternating current full wave rectifier having output connections for supplying unidirectional energizing current to the device and input connections each provided with a voltage doubling capacitor, and alternating current wave forming means including grid controlled wave clipping electron discharge elements connected in push-pull relationship and having output connections with the voltage doubling capacitors of the rectifier for increasing the speed of response of the device.

8. In combination, a device having an operating winding, means for energizing the winding including a full wave rectifier having output connections for supplying unidirectional energizing current to the winding and alternating current input connections each provided with an isolating capacitor, and alternating current wave forming means including grid controlled triode wave clipping electron discharge elements connected in push-pull relationship and having output connections with the isolating capacitors of the rectifier for producing unidirectional energization of the winding to effect high speed opration of the device when the alternating current reaches a predetermined value.

9. In an energization control system for an electromagnetic device, a full wave rectifier having unidirectional output connections for energizing the device and alternating current input connections each provided with an isolating capacitor, and alternating current wave shaping means including grid controlled triode wave clipper electron discharge elements connected in push-pull relationship with the isolating capacitors of the rectifier and having grid voltage control means for producing substantially square half waves to increase the speed of operation of the electromagnetic device when the alternating current reaches a predetermined value.

References Cited in the file of this patent

UNITED STATES PATENTS

| | | |
|---|---|---|
| 1,933,680 | Ohl | Nov. 7, 1933 |
| 1,943,524 | Godsey | Jan. 16, 1934 |
| 2,065,634 | Warrick | Dec. 29, 1936 |
| 2,080,250 | Bedford | May 11, 1937 |
| 2,128,324 | Root | Aug. 30, 1938 |
| 2,406,615 | Lensner | Aug. 27, 1946 |
| 2,427,207 | Grieveson | Sept. 9, 1947 |
| 2,466,689 | Curtis et al. | Apr. 12, 1949 |
| 2,486,712 | Harrison | Nov. 1, 1949 |